US012572454B2

(12) United States Patent
Alshawabkeh et al.

(10) Patent No.: US 12,572,454 B2
(45) Date of Patent: Mar. 10, 2026

(54) IDENTIFYING SOFTWARE MODIFICATIONS ASSOCIATED WITH SOFTWARE PERFORMANCE DEGRADATION

(71) Applicant: Dell Products, L.P., Hopkinton, MA (US)

(72) Inventors: Malak Alshawabkeh, Franklin, MA (US); Pankaj Soni, Sikar (IN); Sunil Gumaste, Bangaluru (IN); Eddie V. Tran, Lowell, MA (US); S. Shrivana Kumar, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 375 days.

(21) Appl. No.: 18/172,398

(22) Filed: Feb. 22, 2023

(65) Prior Publication Data

US 2024/0281362 A1 Aug. 22, 2024

(51) Int. Cl.
G06F 11/3698 (2025.01)
G06F 11/3604 (2025.01)

(52) U.S. Cl.
CPC ...... G06F 11/3698 (2025.01); G06F 11/3616 (2013.01)

(58) Field of Classification Search
CPC .......................... G06F 11/3698; G06F 11/3616
USPC ........................................................ 717/124
See application file for complete search history.

(56) References Cited

U.S. PATENT DOCUMENTS

| | | | | |
|---|---|---|---|---|
| 6,230,313 | B1 * | 5/2001 | Callahan, II ........ | G06F 11/3636 |
| | | | | 717/130 |
| 11,562,168 | B2 * | 1/2023 | Balu .................... | G06V 10/764 |
| 11,645,075 | B1 * | 5/2023 | Wasserstrom ......... | G06N 3/084 |
| | | | | 712/234 |
| 2007/0198445 | A1 * | 8/2007 | Zen .......................... | G06N 7/01 |
| | | | | 706/15 |
| 2011/0060707 | A1 * | 3/2011 | Suzuki ................... | G06N 20/00 |
| | | | | 706/12 |
| 2011/0208849 | A1 * | 8/2011 | Barnett ............... | H04L 63/1433 |
| | | | | 703/23 |
| 2020/0080147 | A1 * | 3/2020 | Aberman ................ | A61P 35/00 |
| 2020/0167137 | A1 * | 5/2020 | Geleji ........................ | G06F 8/60 |
| 2022/0156334 | A1 * | 5/2022 | De Paolis ............. | G06Q 30/02 |

* cited by examiner

*Primary Examiner* — Bradford F Wheaton
(74) *Attorney, Agent, or Firm* — Anderson Gorecki LLP

(57) ABSTRACT

A software analysis system collects a first set of time series counter values from an original version of software instrumented with software telemetry counters, and collects a second set of time series counter values from a modified version of the software that also is instrumented with the software telemetry counters. The first time series become dimensions input to train a weight matrix of a first self-organizing map, to cause the first self-organizing map to cluster the time series into a group of first clusters describing execution of the original software. The second time series become dimensions input to train a weight matrix of a second self-organizing map, to cause the second self-organizing map to cluster the time series into a group of second clusters describing execution of the modified software. Deviation analysis between the first and second groups of clusters is used to identify execution differences between the software versions.

20 Claims, 9 Drawing Sheets

FIG. 5

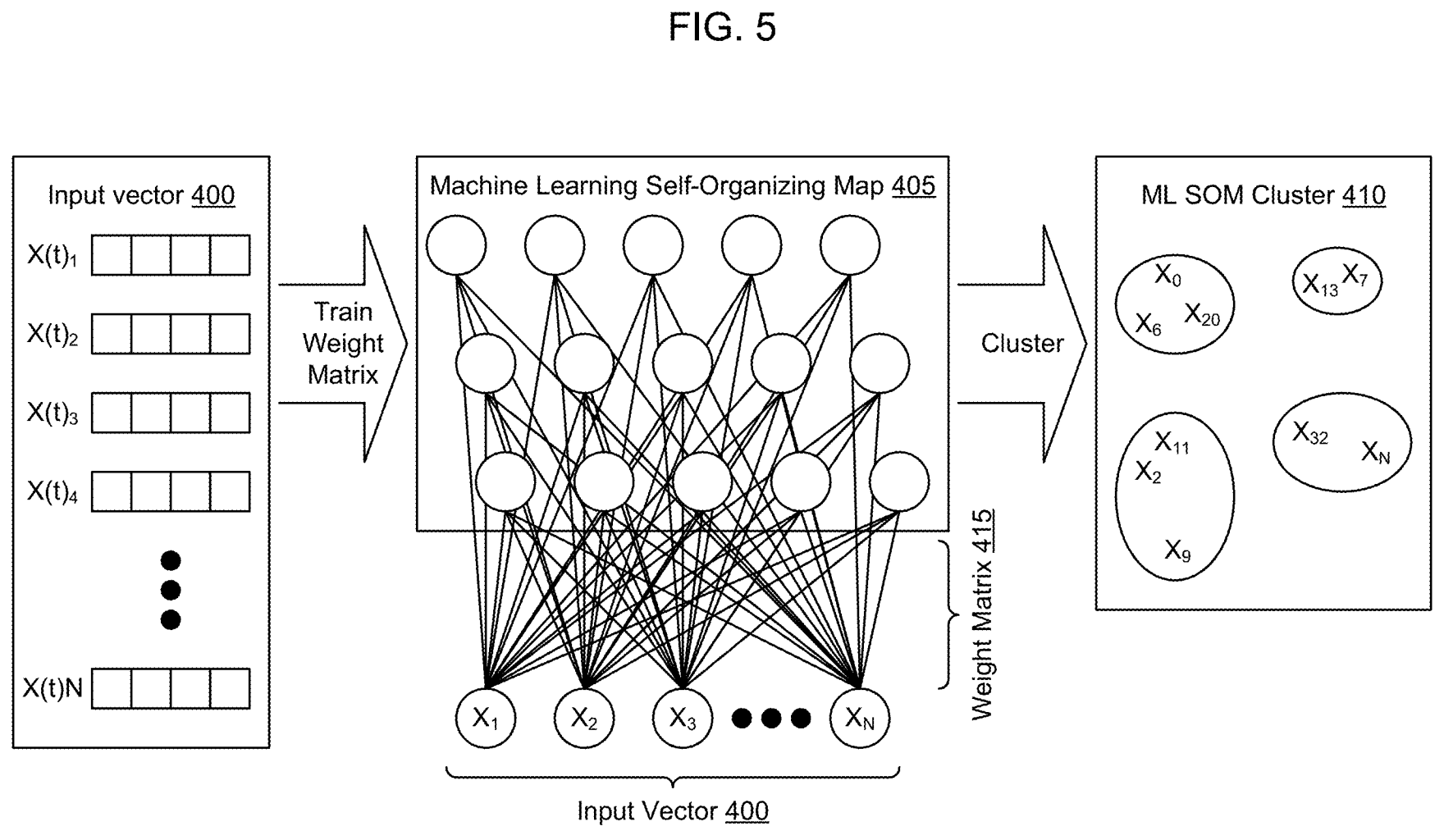

Input vector 400

$X(t)_1$   $X(t)_2$   $X(t)_3$   $X(t)_4$   •••   $X(t)N$

Train Weight Matrix

Machine Learning Self-Organizing Map 405

Weight Matrix 415

Input Vector 400

$X_1$   $X_2$   $X_3$   •••   $X_N$

Cluster

ML SOM Cluster 410

Figure 6:
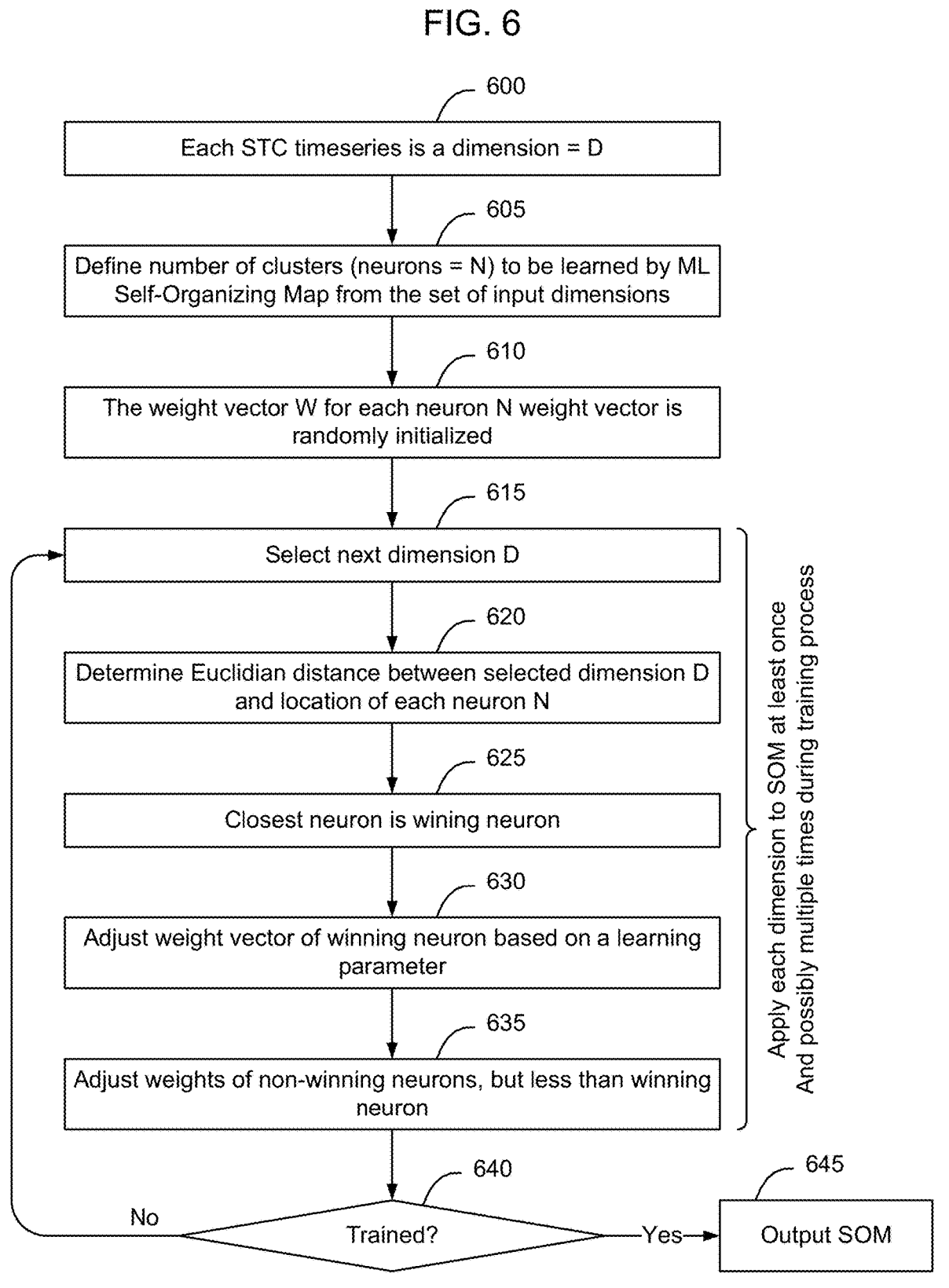

Each STC timeseries is a dimension = D

_605_

Define number of clusters (neurons = N) to be learned by ML Self-Organizing Map from the set of input dimensions

_610_

The weight vector W for each neuron N weight vector is randomly initialized

_615_

Select next dimension D

_620_

Determine Euclidian distance between selected dimension D and location of each neuron N

_625_

Closest neuron is wining neuron

_630_

Adjust weight vector of winning neuron based on a learning parameter

_635_

Adjust weights of non-winning neurons, but less than winning neuron

Apply each dimension to SOM at least once And possibly multiple times during training process

_640_

Trained? — No

Yes →

_645_

Output SOM

FIG. 8

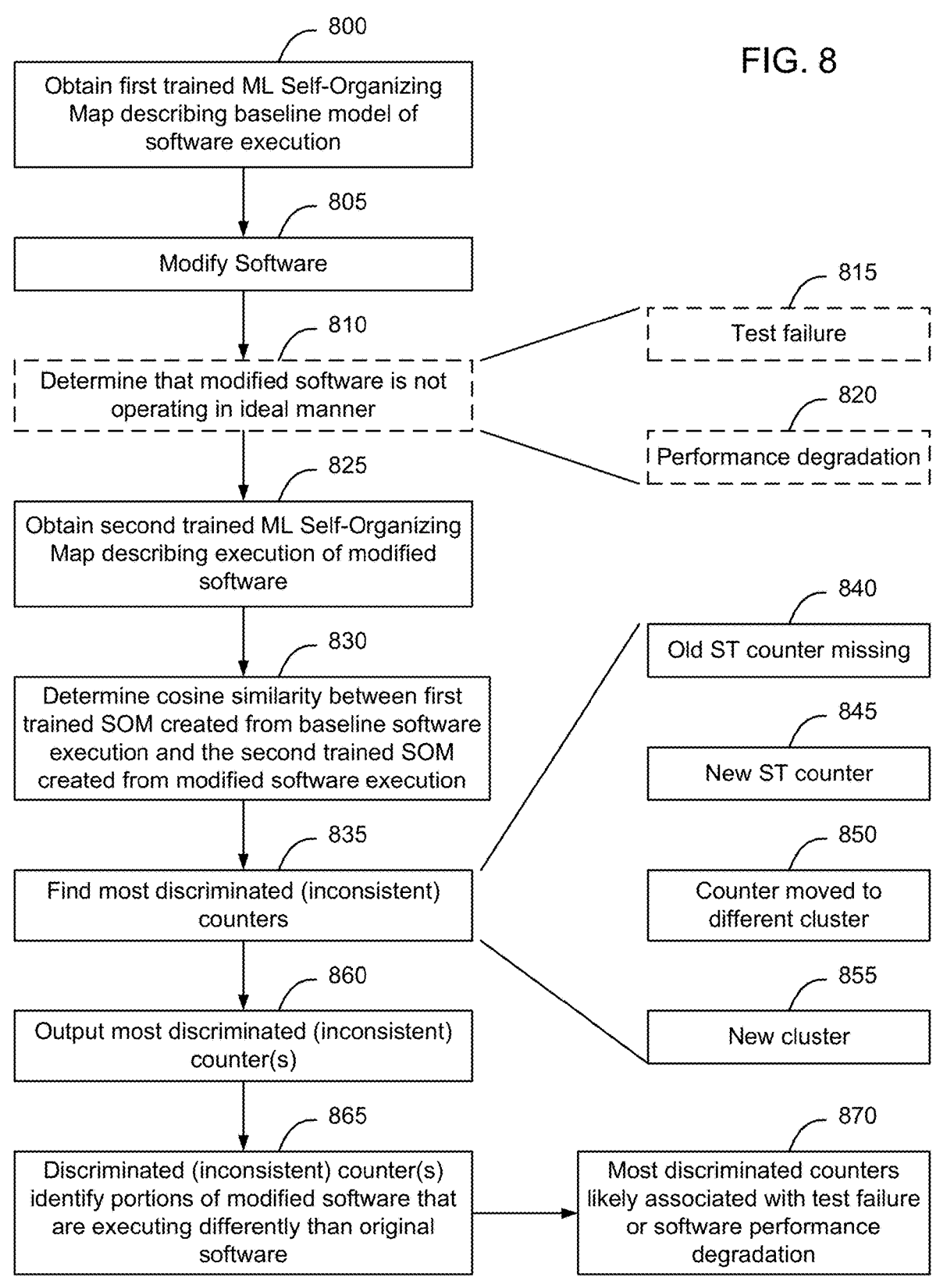

— 800
Obtain first trained ML Self-Organizing Map describing baseline model of software execution — 805
Modify Software — 810
Determine that modified software is not operating in ideal manner — 815
Test failure — 820
Performance degradation — 825
Obtain second trained ML Self-Organizing Map describing execution of modified software — 830
Determine cosine similarity between first trained SOM created from baseline software execution and the second trained SOM created from modified software execution — 835
Find most discriminated (inconsistent) counters — 840
Old ST counter missing — 845
New ST counter — 850
Counter moved to different cluster — 855
New cluster — 860
Output most discriminated (inconsistent) counter(s)

— 865
Discriminated (inconsistent) counter(s) identify portions of modified software that are executing differently than original software — 870
Most discriminated counters likely associated with test failure or software performance degradation

IDENTIFYING SOFTWARE MODIFICATIONS ASSOCIATED WITH SOFTWARE PERFORMANCE DEGRADATION

FIELD

This disclosure relates to computing systems and related devices and methods, and, more particularly, to identifying software modifications associated with software performance degradation.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A software analysis system collects a first set of time series counter values from an original version of software instrumented with software telemetry counters, and collects a second set of time series counter values from a modified version of the software that also is instrumented with the software telemetry counters. The first time series become dimensions input to train a weight matrix of a first self-organizing map, to cause the first self-organizing map to cluster the time series into a group of first clusters describing execution of the original software. The second time series become dimensions input to train a weight matrix of a second self-organizing map, to cause the second self-organizing map to cluster the time series into a group of second clusters describing execution of the modified software. Deviation analysis between the first and second groups of clusters is used to identify execution differences between the software versions.

Software is instrumented with software telemetry counters that are incremented whenever a branch of the software containing a respective software telemetry counter is executed. In some embodiments, a unique timeseries $X(t)_1$-$X(t)_N$ is created for each software telemetry counter over a monitoring interval, by determining the values of the software telemetry counters according to a defined periodicity. Each software telemetry counter timeseries is a dimension D that is used to create an input vector that is used to train a Machine Learning (ML) self-organizing map, to cause the ML self-organizing map to create a set of clusters of the input dimensions.

When the software is modified, the modified software is executed and the values of the ST counters of the executing modified software are collected over a monitoring interval having the same duration as the original monitoring interval and using the same periodicity, to create a second set of unique timeseries $X(t)_1$-$X(t)_N$ for each ST counter. Each of the second set of software telemetry counter timeseries is a dimension D that is used to create a second input vector that is used to train a second machine learning self-organizing map, to cause the second ML self-organizing map to create a second set of clusters of the second set of input dimensions.

Deviation analysis between the first set of clusters created by the first ML self-organizing map and the second set of clusters created by the second ML self-organizing map is used to identify a set of dimensions (software telemetry counters) that are most discriminated (different) in the modified software. The software telemetry counters that are most discriminated identify aspects of the modified software that are operating differently than the original software. In instances where the modified software is exhibiting performance degradation relative to the original software, the discriminated software telemetry counters can provide insight as to aspects of the modified software that may be investigated to locate the cause of the performance degradation.

In some embodiments, a method of using a set of self-organizing maps to identify software modifications associated with software performance degradation, includes executing a first version of software, the first version of the software having a first plurality of software branches that are instrumented with a first plurality of software telemetry counters, each respective software telemetry counter of the first plurality of software telemetry counters being configured to increment when execution of the respective branch of the first plurality of software branches containing the respective software telemetry counter is executed, periodically collecting values of each of the first software telemetry counters over a first monitoring interval to create a plurality of first time series, one respective first time series for each respective first software telemetry counter, and using each of the first time series as first dimensions of a first input vector to train a first machine learning self-organizing map, to cause the first machine learning self-organizing map to create a first plurality of clusters, each of the first plurality of clusters containing a respective subset of the first time series with similar time series characteristics. The method also includes executing a second version of the software, the second version of the software having a second plurality of software branches that are instrumented with a second plurality of software telemetry counters, each respective software telemetry counter of the second plurality of software telemetry counters being configured to increment when execution of the respective branch of the second plurality of software branches containing the respective software telemetry counter is executed, periodically collecting values of each of the second software telemetry counters over a second monitoring interval to create a second plurality of time series, one respective second time series for each respective software telemetry counter, the second monitoring interval having a same amount of time as the first monitoring interval, and using each of the second time series as second dimensions of a second input vector to train a second machine learning self-organizing map, to cause the second machine learning self-organizing map to create a second plurality of clusters, each of the second plurality of clusters containing a respective subset of the second time series with similar time series characteristics. The method also includes implementing a deviation analysis comparing the first plurality of clusters with the second plurality of clusters to identify one or more of the second software telemetry counters that are discriminated in the second plurality of clusters relative to the first plurality of clusters.

In some embodiments, the second version of the software is a modified version of the first version of the software. In some embodiments, a subset of the second plurality of software branches are the same as a subset of the first plurality of software branches; and a subset of the second plurality of software telemetry counters are the same as a subset of the first plurality of software telemetry counters.

In some embodiments, the first and second software telemetry counters are implemented as instructions embedded within sequences of operational instructions within the respective first and second versions of the software.

In some embodiments, each time series is a dataset containing a sequence of data points representing a particular software telemetry counter value that is indexed in time order.

In some embodiments, using each of the first time series as first dimensions of the first input vector causes the first machine learning self-organizing map to create a first weight matrix mapping the first dimensions of the first input vector to a set of first neurons, each first neuron being associated with a respective cluster of the first plurality of clusters, and using each of the second time series as second dimensions of the second input vector causes the second machine learning self-organizing map to create a second weight matrix mapping the second dimensions of the second input vector to a set of second neurons, each second neuron being associated with a respective cluster of the second plurality of clusters. In some embodiments, a number of neurons in the second set of neurons is the same as a number of neurons in the first set of neurons. In some embodiments, the number of first neurons is approximately equal to a square root of the number of first dimensions.

In some embodiments, periodically collecting the values of each of the first software telemetry counters over the first monitoring interval is implemented at a fixed periodicity, and periodically collecting the values of each of the second software telemetry counters over the second monitoring interval is implemented at the same fixed periodicity.

In some embodiments, the first machine learning self-organizing map is a first trained neural network, and the second machine learning self-organizing map is a second trained neural network.

In some embodiments, each cluster has a membership including a subset of the software telemetry counters. In some embodiments, each cluster further includes location coordinates within the self-organizing map of a neuron associated with the cluster.

In some embodiments, the time series characteristics include a movement of the counter values over time and a shape of a graph of the time series.

In some embodiments, implementing the deviation analysis comparing the first plurality of clusters with the second plurality of clusters provides, as an output, a set of software telemetry counters that identify software branches of the executing first version of the software that have different execution characteristics in the executing second version of the software.

In some embodiments, implementing a deviation analysis comparing the first plurality of clusters with the second plurality of clusters provides, as an output, a set of software telemetry counters that are clustered differently in the second machine learning self-organizing map than in the first machine learning self-organizing map.

In some embodiments, each cluster includes a membership list identifying which software telemetry counters were clustered into the respective cluster, and implementing a deviation analysis includes comparing membership lists of the first plurality of clusters with membership lists of the second plurality of clusters to identify software telemetry counters that have been clustered differently in the second plurality of clusters relative to the first plurality of clusters. In some embodiments, cosine similarity is used to implement the deviation analysis.

BRIEF DESCRIPTION OF THE DRAWINGS

FIG. 5 is functional block diagram showing use of the input vector to train a weight matrix of a Machine Learning (ML) self-organizing map to cause the ML self-organizing map to generate clusters of the input dimensions, according to some embodiments.

FIG. 6 is flowchart of an example method of training a ML self-organizing map, according to some embodiments.

FIG. 8 is flowchart of an example method of implementing deviation analysis between a set of separately trained ML self-organizing maps to identify software modifications associated with software performance degradation, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
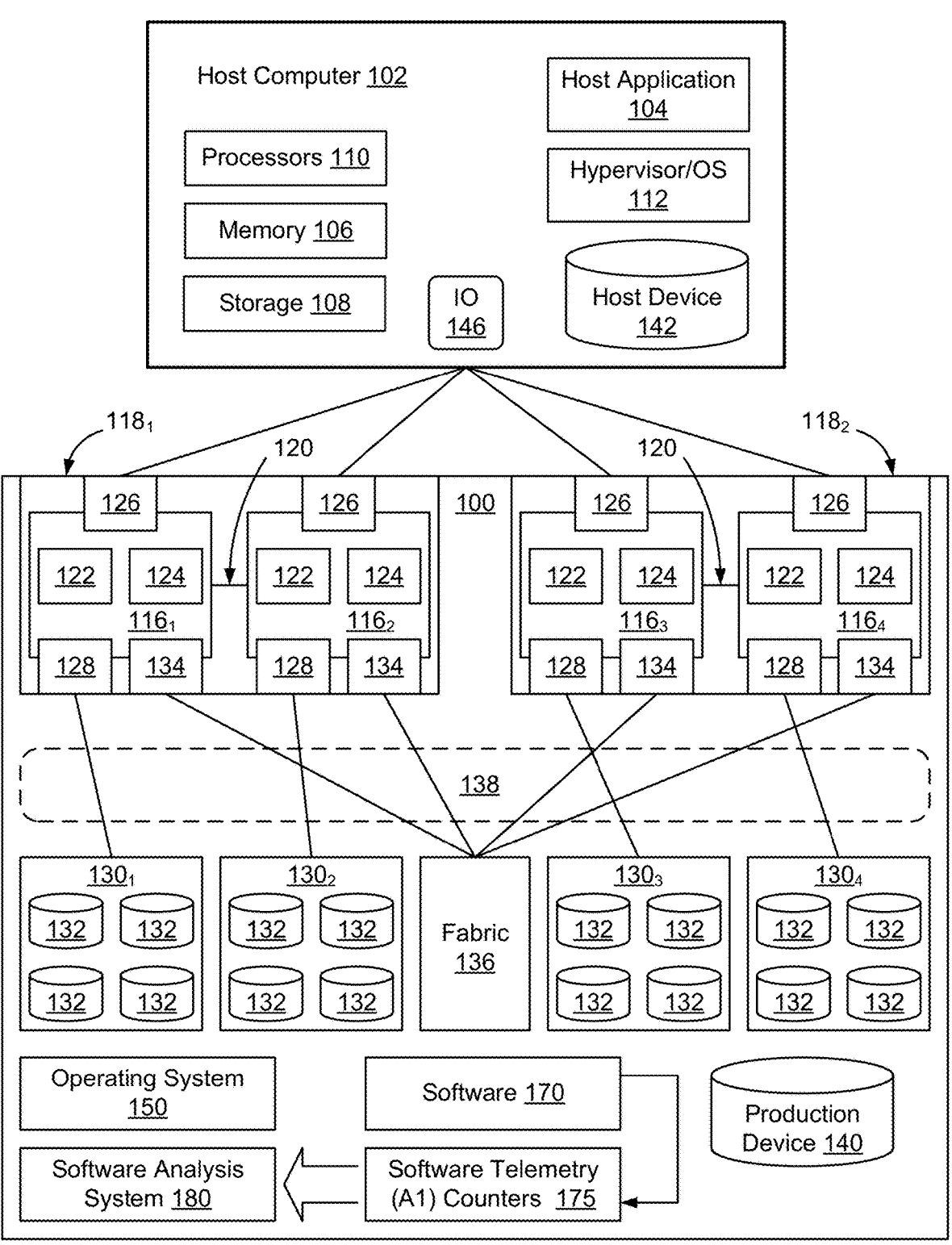
FIG. 1 is a functional block diagram of an example storage system connected to a host computer, including software instrumented with software telemetry counters, and including a software analysis system, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes 116$_1$-116$_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

As shown in FIG. 1, storage systems are complex computer implemented systems that include multiple software applications 170 controlling operation of various aspects of the storage system. Example software applications may be associated with implementing input/output operations on the storage system 100, mirroring data between storage systems, managing data within the storage resources, creating and managing metadata, and hundreds of other functions. Many software applications 170 may be executing simultaneously on the storage system, depending on the implementation.

Software 170 is often changed, for example to fix known errors or vulnerabilities, to add new functionality, or for various other reasons. When software 170 is changed, it is possible that the new version of the software might exhibit some performance degradations under particular circumstances. For example, a given software modification may be implemented and pass all functional testing and performance testing. However, once deployed, the software may exhibit slower performance under particular operating conditions, on particular storage systems, or in other particular circumstances. Determining the particular software modifications associated with the performance degradation may be difficult to diagnose and require extensive analysis. In some situations, identifying and fixing software that causes performance regressions is one of the most expensive, tedious, and time-consuming tasks in the software development life-cycle.

It is possible to add counters to software paths that are incremented any time the software execution causes execution of the particular path. In some embodiments, software telemetry counters (STCs) 175 are placed in critical code paths by developers that are experts in maintaining, updating, and creating software 170 designed to execute on the storage system. The key code paths might be code that is caused to execute during normal operation, as well as in code paths that are configured to be executed in connection with events that are associated with particular types of failures, for example, such as retry paths etc. In some embodiments, a single operation, such as an IO request, will stream a variety of events (or counters) as the IO request progresses through the storage system. Similarly, failures, retry operations, automated error correction events, and numerous other actions of the software 170 on the storage system will cause particular software telemetry counters 175 to be incremented.

For example, as shown in FIG. 1, in some embodiments the example storage system includes software 170 instrumented with software telemetry counters 175. The values of the software telemetry counters 175 are periodically collected, and are used by a software analysis system 180 to determine which aspects of the software are being executed over time. Although some embodiments are described herein in which the software 170 is configured to execute on storage system 100, it should be understood that software 170 instrumented with software telemetry counters 175 may be configured to operate in other environments as well. Thus, the techniques described herein may be more broadly applicable to determining changes in software execution for any software that is instrumented with software telemetry counters 175.

According to some embodiments, the values of each software telemetry counter 175 is collected over time to form a set of software telemetry counter time-series datasets, each time-series dataset containing a sequence of data points (software telemetry counter values for the respective software telemetry counter) indexed in time order. A software application may include thousands of software telemetry counters 175, and accordingly, in some embodiments, a respective time-series dataset is collected for each for each of the thousands of software telemetry counters 175.

Figure 2:
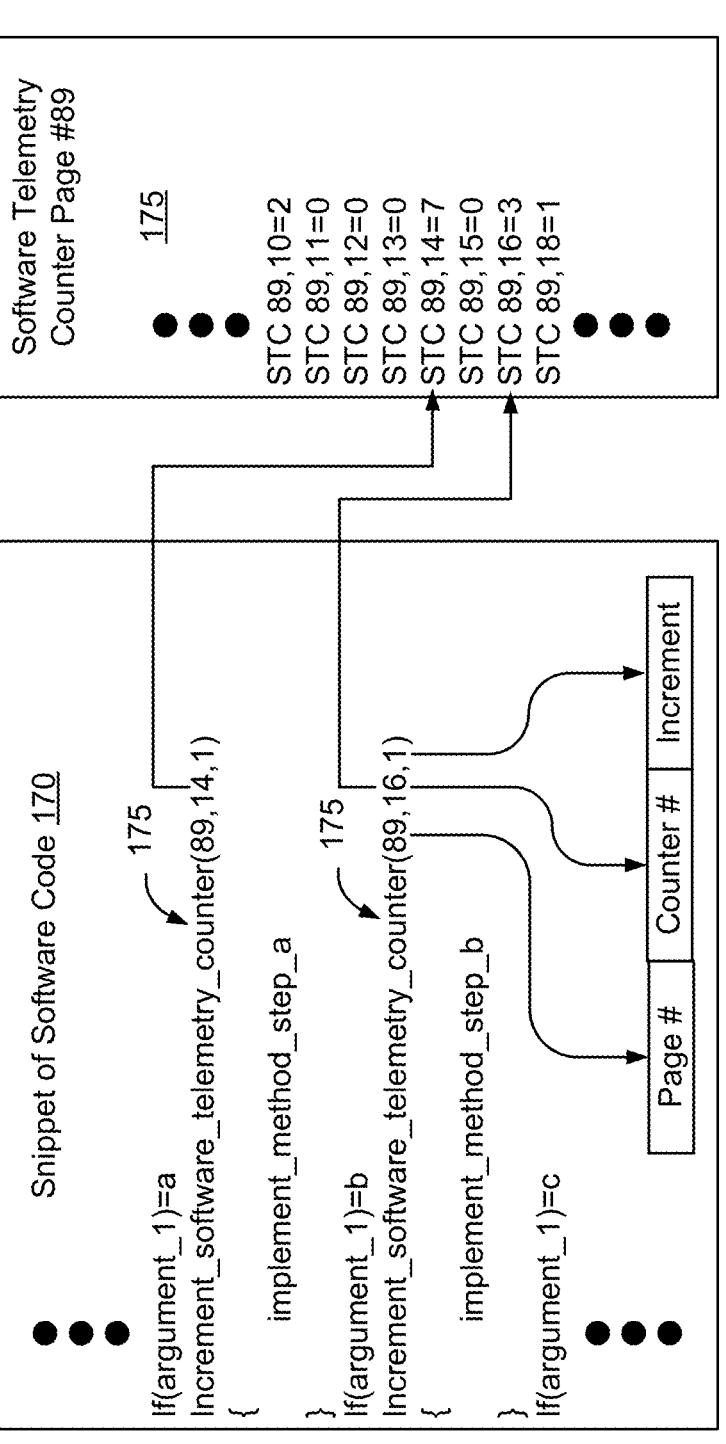
FIG. 2 is a functional block diagram an example software code snippet containing a set of software telemetry counters, according to some embodiments.

FIG. 2 is a functional block diagram an example snippet of software code 170 containing a set of software telemetry counters 175, according to some embodiments. As shown in FIG. 2, in some embodiments, software 170 may be conceptualized as having a series of instructions. When executing, the software instructions may execute in order, or execution of the software may branch causing particular instructions to be skipped or to be repeated. Software telemetry counters 175, in some embodiments, are implemented as instructions within the software that cause a particular variable (the software telemetry counter) to be incremented whenever the instruction is encountered and executed during execution of the software. For example, as shown in FIG. 2, in the illustrated example the software instruction "Increment_software_telemetry_counter(89,14, 1) is used to specify that value of software telemetry counter number #14, of software telemetry counter page #89, be increased (incremented) by the value 1. This instruction implementing the software telemetry counter is executed in instances where the software executes the branch of the software associated with the condition "if(argument_1)=a". It should be understood that the particular manner in which the software telemetry counters 175 are implemented will depend on the particular implementation. For example, different software programming languages may require that different instructions be used to implement the software telemetry counters 175, as would be understood to a person of ordinary skill in the art.

Software telemetry counters 175 are included in the software 170 to collect time series software telemetry counter data. In some embodiments, the software telemetry counters 175 are implemented using instructions to increment a particular counter value every time the software branch including the software telemetry counter is executed. Software often is implemented as a sequence of instructions that occur in a predefined order. Depending on the values of particular variables, and other environmental parameters, execution of the software may branch, to cause different sets of instructions to be executed. For example, one software branch (set of software instructions) may be used to implement a first function, and a second software branch may be used to implement a second function. Software telemetry counters, in some embodiments, are implemented as instructions embedded within the sequences of operational instructions of the software, e.g., on feature branches of the software and at critical points in the code. When the software 170 executes a sequence of operations that includes a particular software telemetry counter, the execution of that sequence of operations will cause the value particular software telemetry counter to be incremented. By reading the values of the software telemetry counters, it accordingly is possible to determine what branches of the software were executing during a preceding time interval.

In some embodiments, the values of a set of software telemetry counters is periodically reported. There may be thousands of software telemetry counters depending on the implementation. In some embodiments, the software telemetry counter values are all reset to zero after the software telemetry counter values are reported. In some embodiments, the software telemetry counter values continue to increase over time and are not reset each time the software telemetry counter values are reported.

Figure 3:
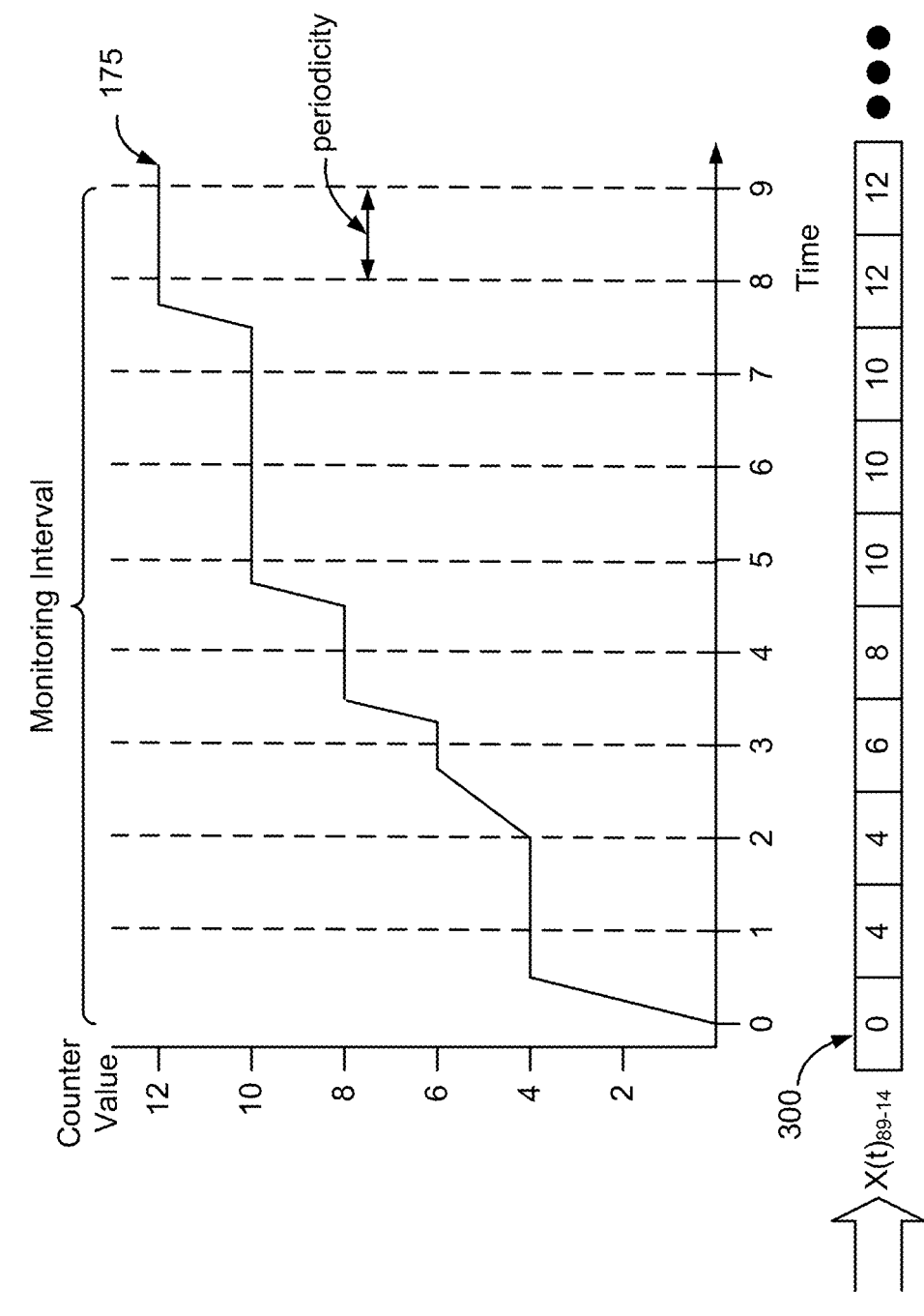
FIG. 3 is a graph showing a hypothetical variation of an example individual software telemetry counter over time, and showing the corresponding time-series representation X(t) of the example software telemetry counter, according to some embodiments.

FIG. 3 is a graph showing a hypothetical variation of an example individual software telemetry counter (89-14) over time, and showing the corresponding time-series representation X(t) of the example software telemetry counter (89-14), according to some embodiments. As shown in FIG. 3, a particular software telemetry counter (89-14 in this example) may be incremented over time, for example each time the particular software branch containing the counter is executed. In the example shown in FIG. 3, the values of software telemetry counter 89-14 at multiple periods during a monitoring interval is ascertained and used to form a time-series dataset $X(t)_{89-14}$ for the software telemetry counter. As used herein, the term "time-series" will be used to refer to a sequence of data points (software telemetry counter values for the respective software telemetry counter), determined according to a predefined periodicity during a monitoring interval, and indexed in time order. Thus, as shown on the bottom of FIG. 3, the time-series for software telemetry counter 89-14 ($X(t)_{89-14}$) includes the values [0, 4, 4, 6, 8, 10, 10, 10, 12, 12 . . . ].

Figure 4:
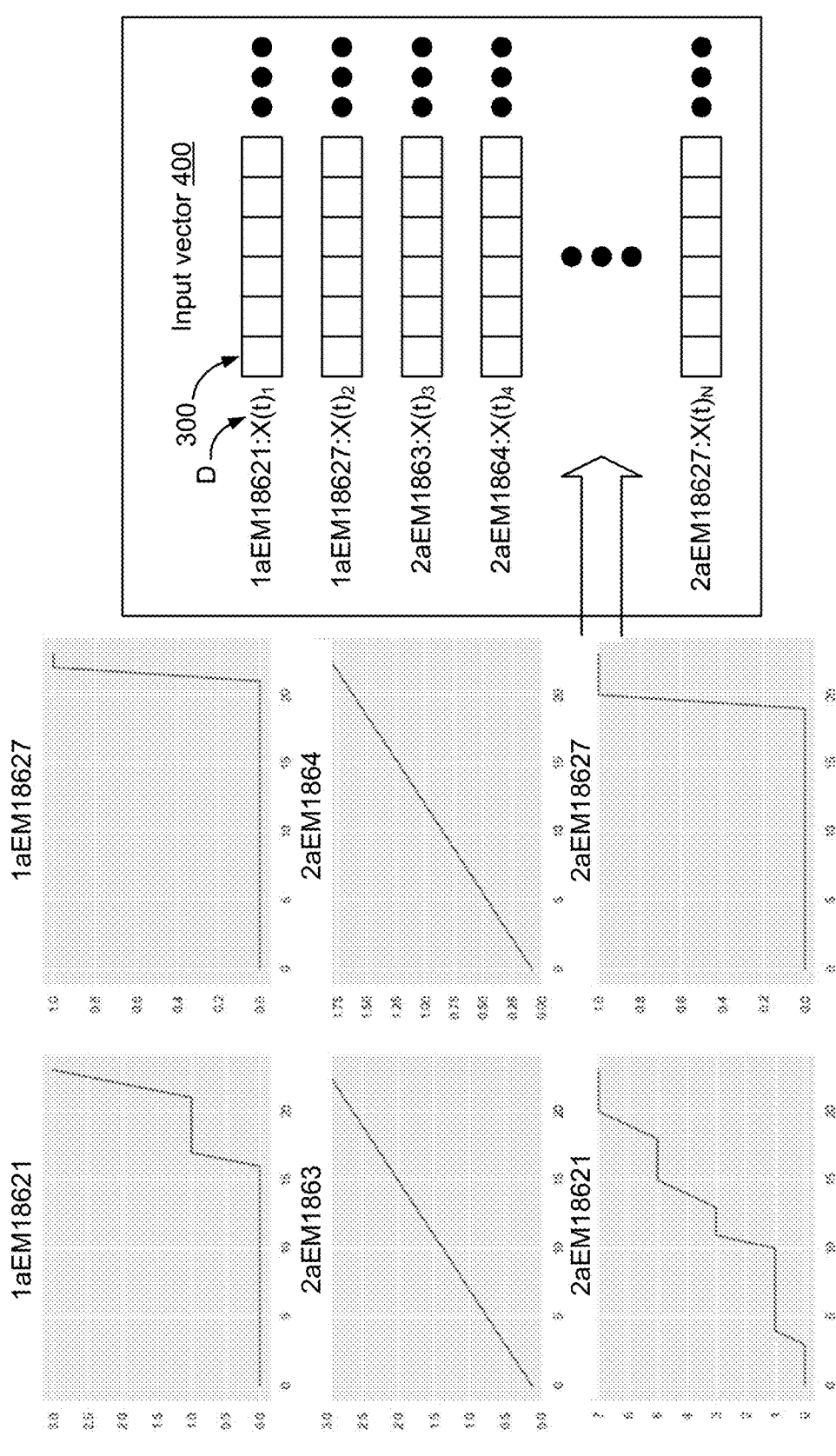
FIG. 4 is block diagram showing the relationship between a set of multiple software telemetry counters over time and the corresponding respective time-series representations of the example software telemetry counters, in which each time-series representation becomes a dimension D of an input vector, according to some embodiments.

FIG. 4 is a block diagram showing the relationship between a set of multiple software telemetry counters over time, and the corresponding respective time-series representations of the example software telemetry counters, in which each time-series representation becomes a dimension D of an input vector 400 that will be used to train a Machine Learning (ML) self-organizing map 405, according to some embodiments. Specifically, by characterizing the software telemetry counter over time, it is possible to utilize the characteristics (movement and shape) of each given time series software telemetry counter data to create a dimension in input space, and thus to be able to transform the set of software telemetry counters 175 into a high dimensional timeseries input vector 400.

As shown in FIG. 4, in some embodiments a unique timeseries $X(t)_1$-$X(t)_N$ is created for each software telemetry counter 175 over a monitoring interval. The monitoring interval may be a period of time, for example 24 hours, although other monitoring intervals may be utilized as well. During the monitoring interval, the values of each of the software telemetry counters will be periodically determined. For example, the values of each software telemetry counter may be determined every 10-60 minutes during the monitoring interval. The particular duration of the monitoring interval and the particular periodicity with which the software telemetry counter values are determined will depend on the particular implementation.

Each timeseries 300 is a dimension D that is used to create input vector 400. Accordingly, in an implementation where software 170 included 2000 software telemetry counters 175, the input vector 400 would include 2000 timeseries $X(t)_1$-$X(t)_{2000}$, and each timeseries X(t) would be a separate dimension D describing evolution of the particular software telemetry counter over the monitoring interval.

When a software modification causes a performance degradation in the software, developers conventionally use the software telemetry counters to debug the performance issue. Particularly when a software modification has caused a performance degradation, software developers may rely heavily on the software telemetry counters to glean insight into how the software is operating, and may spend hours manually shifting through thousands of software telemetry counter values to manually determine a possible cause of the performance degradation (bottleneck). Similarly, developers also use software telemetry counters to validate product features. Incorrect incrementing of particular software telemetry counters may be used to identify incorrect software transitions, which may indicate that the software is not operating as expected/intended. The problem is that, with a complex software system, the number of software telemetry counters can become overwhelming. For example, it is not uncommon for the software to include thousands or tens of thousands of software telemetry counters. Wading through this large amount of data is challenging. Further, when a developer is analyzing the software telemetry counters to identify a possible cause of a software degradation, the values of the software telemetry counters are point in time values, which means that the developer can only obtain the current value of the software telemetry counter, but the counters themselves don't include historical values showing the previous values of the software telemetry counters over a preceding time interval.

According to some embodiments, a neural network clustering process based on ML self-organizing maps is trained to generate a weight matrix mapping the dimensions contained in the input vector 400 to a set of neurons defining clusters of software telemetry counters with similar timeseries. The ML self-organizing map clustering process is initially trained on the software before any modifications are implemented on the software. Subsequently, if the software is modified and the software performance is determined to be degraded in some manner, the software telemetry counters from the modified software are sampled over a monitoring interval having the same duration as the original monitoring interval, and the values of the software telemetry counters are collected using the same periodicity as the software telemetry counters were originally collected. The software telemetry counter timeseries are used to form a second input vector for the modified software, that is used to train a second ML self-organizing map neural network. Once trained, the clusters of the second ML self-organizing map are and the clusters of the first ML self-organizing map are used to implement deviation analysis to identify a set of software telemetry counters that are most discriminated (clustered differently) in the two ML self-organizing maps. The identified set of most discriminated software telemetry counters identify aspects of the software that are operating differently after modification of the software and, hence, possible causes of the software degradation. By using a clustering process to identify a base "normal" code functionality pattern, when new code changes are introduced that are functionally similar, yet appear in inconsistent forms, the software analysis system 180 is able to automatically detect any difference in how the software is functioning, to thus highlight aspects of the modified software that are exhibiting a change in functionality and, accordingly, possibly associated with the change in performance.

FIG. 5 is functional block diagram showing use of the input vector 400 to train a weight matrix of a Machine Learning (ML) self-organizing map 405 to cause the ML self-organizing map to learn clusters 410 of the input dimensions D, according to some embodiments. As shown in FIG. 5, and as described in greater detail in FIG. 6, a ML self-organizing map 405 is a type of artificial neural network often known as a Kohonen map. The ML self-organizing map 405 is built to produce a low-dimensional representation of a higher-dimensional dataset while preserving the topological structure of the input data. The output layer and the input layer are the two layers that make up the ML self-organizing map.

The goal of a self-organizing map is to cluster a set of individual software telemetry counter timeseries dimensions with respect to their similarity, such that similar time-series are grouped into the same cluster. For example, in FIG. 4, the timeseries for 1aEM18627 is similar to the timeseries for 2aEM18627, since both timeseries exhibit a stepwise increase around time step 20. Likewise, the timeseries for 2aEM1863 is similar to the timeseries for 2aEM1864, since both timeseries exhibit a linear increase from time 0-20. By clustering the timeseries, it is possible to create a set of clusters, each of which has a membership including a subset of the input dimensions (software telemetry counters).

In some embodiments, the N dimensions $(X(t)_1$ to $X(t)_N)$ are the input layer and will be mapped by the neural network implemented as a ML self-organizing map to a number of clusters. The clusters are represented in the ML self-organizing map as a set of M neurons.

According to some embodiments, the number of neurons M is determined in advance, to specify to the neural network how many clusters should be created from the input vector 400 containing the N dimensions $(X(t)_1$ to $X(t)_N)$. In some embodiments, M is approximately equal to the square root of the number of N dimensions $M \approx \sqrt{N}$, although it should be understood that the particular number of M neurons selected to characterize the N dimensions will depend on the particular implementation.

FIG. 6 is flowchart of an example method of training a ML self-organizing map, according to some embodiments. As shown in FIG. 6, in some embodiments each software telemetry counter timeseries is a dimension (D) (block 600) that will be input to train the ML self-organizing map. As noted above, training a ML self-organizing map 405 involves providing an input vector containing a plurality of dimensions, to cause the ML self-organizing map to learn a weight matrix translating the input dimensions to a plurality of clusters, each cluster being represented by a neuron in the ML self-organizing map 405.

To train the ML self-organizing map, the number of neurons is specified in advance. A ML self-organizing map may have any number of neurons (greater than one), depending on the implementation. A person will specify the number of neurons that should be used to describe the input dimension space (block 605). In some embodiments, the number of neurons is approximately equal to the square root of the number of dimensions, but different numbers of neurons may be used depending on the implementation.

Once the preferred number of neurons has been selected (block 605) a weight vector for each neuron is randomly initialized (block 610). The particular manner in which the initial weight vector is selected will depend on the particular implementation.

The weight vectors for the neurons are then trained using the input dimensions. For example, in some embodiments a given dimension D is selected (a particular software telemetry counter time series is selected) (block 615), and an Euclidian distance between the selected dimension D and each of the neurons N is determined (block 620). The neuron that is closest to the selected dimension D is the winning neuron (block 625). The weight vector of the winning neuron is adjusted based on a learning parameter (block 630), and the weights of the other neurons are adjusted as well, but less than the winning neuron.

A subsequent dimension D is then selected (block 615) and used to adjust the weight vectors (blocks 620-635). In this manner, each dimension is input to the ML self-organizing map, possibly multiple times. Periodically, the ML self-organizing map may be evaluated to determine if the weight matrix is sufficiently trained (block 640). While the weight matrix is still changing (a determination of NO at block 640), the dimensions continue to be applied. When the ML self-organizing map is determined to be sufficiently trained (a determination of YES at block 640), the clusters created by the self-organizing map are output (block 645). The clusters might be specified using location coordinates, and will include membership lists specifying which dimensions (which software telemetry clusters) are determined to reside within each cluster.

Figure 7:
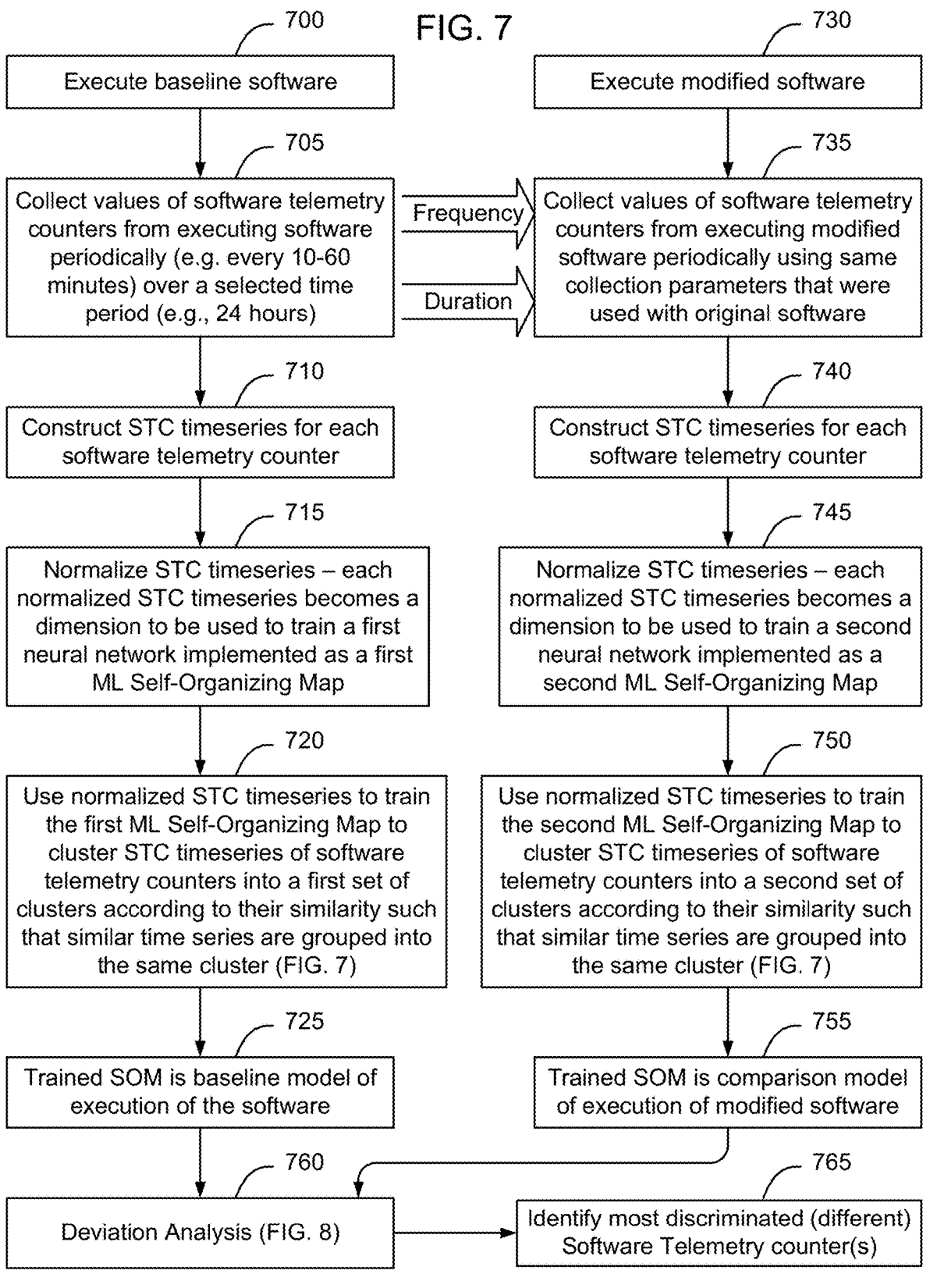
FIG. 7 is flowchart of an example process of using a set of separately trained ML self-organizing maps to identify software modifications associated with software performance degradation, according to some embodiments.

FIG. 7 is flowchart of an example process of using a set of separately trained ML self-organizing maps to identify software modifications associated with software performance degradation, according to some embodiments. As shown in FIG. 7, in some embodiments baseline software is executed (block 700) and a set of values of software telemetry counters are collected from the executing software periodically during a monitoring window (block 705). An example periodicity may be on the order of every 10-60 minutes, and the monitoring window may be on the order of 24 hours, depending on the implementation.

A software telemetry counter timeseries is created for each software telemetry counter (block 710), and the normalized software telemetry counter timeseries become dimensions D (block 715) that are used to train a first ML self-organizing map (block 720). Training the first ML self-organizing map organizes the software telemetry counters into a first set of clusters according to their similarity, such that software telemetry counters with similar time series characteristics are grouped into the same cluster. The first set of clusters created by the first ML self-organizing map becomes the baseline model of execution of the baseline software (block 725).

The software is then modified, and the modified software is executed (block 730). A set of values of software telemetry counters are collected from the executing modified software periodically during a monitoring window (block 735). Importantly, the length of the monitoring window and the periodicity of with which the software telemetry counters are collected from the modified software during the monitoring window should be the same as the monitoring window length and periodicity of block 705. For example, if the original trained ML self-organizing map was trained using time-series that were created by determining the values of the software telemetry counters every 60 minutes for a 24 hour monitoring window, the software telemetry counter values should similarly be collected from the executing modified software every 60 minutes for a 24 hour monitoring window. By using the same collection parameters it is possible to create similar dimensions D characterizing execution of the modified software as were used to characterize execution of the baseline software.

A software telemetry counter timeseries is created for each software telemetry counter from the software telemetry counter values of the executing modified software (block 740), and the each normalized software telemetry counter timeseries becomes a dimension D (block 745) that are used to train a second ML self-organizing map (block 750). Importantly, the second ML self-organizing map should have the same number of neurons as was selected when creating the first ML self-organizing map. For example, if the first ML self-organizing map was created using 15 neurons, then the second ML self-organizing map should also be created using 15 neurons. Training the second ML self-organizing map organizes the software telemetry counters into a second set of clusters according to their similarity, such that software telemetry counters with similar time series characteristics are grouped into the same cluster. The second set of clusters created by the second ML self-organizing map becomes the comparison model, describing execution of the modified software (block 755).

Deviation analysis (block 760) is then used to identify the most discriminated (different) software telemetry counters (block 765). Additional details associated with deviation analysis are described below in connection with FIG. 8. By identifying a set of software telemetry counters (block 765) that have different time-series characteristics, and hence are clustered differently by the first ML self-organizing map created for the original software and the second ML self-organizing map created for the modified software, it is possible to identify portions of the modified software that are exhibiting different execution characteristics. When looking for regions of the software that might be causing performance degradation, this difference analysis is able to quickly likely portions of the code that could be responsible for the performance degradation.

FIG. 8 is flowchart of an example method of implementing deviation analysis between a set of separately trained ML self-organizing maps to identify software modifications associated with software performance degradation, according to some embodiments. As shown in FIG. 8, in some embodiments a first trained ML self-organizing map is obtained describing a baseline model of software execution (block 800). In some embodiments, the trained ML self-organizing map creates first set of clusters of dimensions, in which each dimension represents a time-series set of values of a particular software telemetry counter. Each cluster contains a subset of the dimensions, and includes a membership list identifying which dimensions were clustered into the particular cluster.

The software is then modified (block 805) and a determination is then made that modified software is not operating in an ideal manner (block 810). There are many possible reasons that may cause a determination that the modified software is not operating in an ideal manner, such as a test failure (block 815) or a detected performance degradation (block 820). It should be noted that determining that the modified software is not operating in an ideal manner is an optional step—the process shown in FIG. 8 may optionally be implemented any time a software modification occurs to determine execution differences between the previous software version or baseline software version, and the modified software version.

A second trained ML self-organizing map is then obtained describing execution of the modified software (block 825). In some embodiments, the second trained ML self-organizing map creates second set of clusters of dimensions, in which each dimension represents a time-series set of values of a particular software telemetry counter. Each cluster of the second set of clusters contains a subset of the dimensions, and includes a membership list identifying which dimensions were clustered into the particular cluster of the second set of clusters.

In some embodiments, the deviation analysis compares the clusters and dimension membership of the first ML self-organized map with the clusters and dimension membership of the second ML self-organized map. In some embodiments, the cosine similarity between the first trained ML self-organized map created from the baseline software execution and the second trained ML self-organized map created from the modified software execution is determined (block 830). Cosine similarity is a measure of similarity between two non-zero vectors defined in an inner product space. Cosine similarity is the cosine of the angle between the vectors; that is, the dot product of the vectors divided by the product of their lengths. By determining the cosine similarity between the two trained ML self-organizing maps (created to describe execution of the original software and created to describe execution of the modified software), it is possible to identify the most discriminated (inconsistent) software telemetry counters (block 835). Software telemetry counters may be determined to be discriminated for various reasons. For example, the modified software may omit one of the previous software telemetry counters (block 840) or may include one or more new software telemetry counters (block 845). Additionally, execution of the modified software may cause one or more software telemetry counters to be moved between clusters (block 850) or may cause the ML self-organizing map to learn a different cluster (block 855).

The deviation analysis outputs a set of most discriminated (inconsistent) software telemetry counters (block 860). The discriminated (inconsistent) software telemetry counters identify portions of the modified software that are executing differently than the original software (block 865). Accordingly, the most software telemetry discriminated counters are likely associated with the test failure (block 815) or software performance degradation (block 820), and are good candidates for evaluation when looking to determine why the modified software is not operating in an ideal manner.

Figure 9:
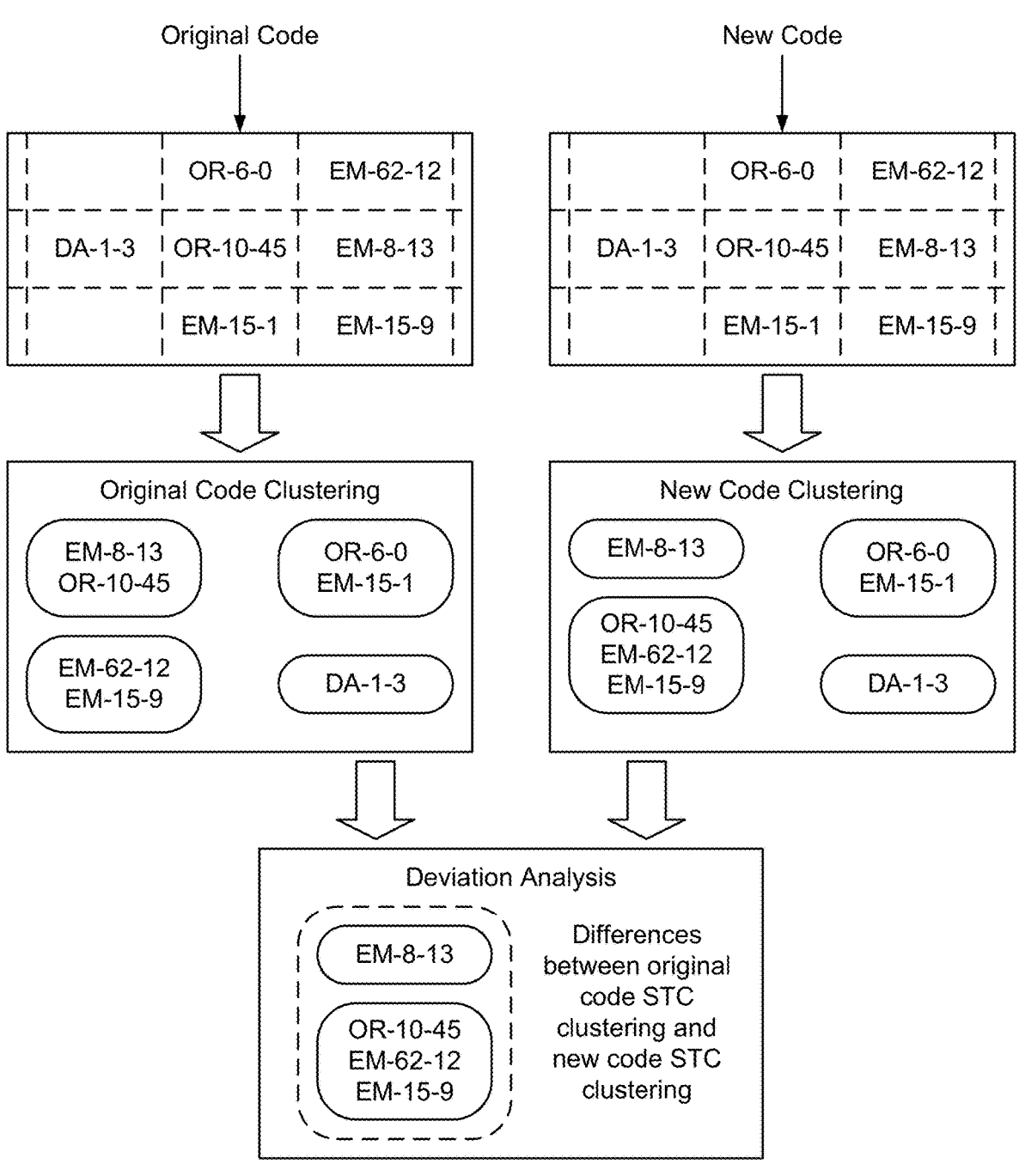
FIG. 9 is a block diagram graphically depicting a process of using a set of separately trained ML self-organizing maps to identify software modifications associated with software performance degradation, according to some embodiments.

FIG. 9 is a block diagram graphically depicting a process of using a set of separately trained ML self-organizing maps to identify software modifications associated with software performance degradation, according to some embodiments. As shown in FIG. 9, both the original code and the new code include software telemetry counters. The values of the software telemetry counters are periodically collected with the same periodicity over monitoring intervals having the same duration. The time-series software telemetry counters of the original software is used to train a first ML self-organizing map which clusters the software telemetry counters into a first set of clusters, in which each cluster contains software telemetry counters that exhibited similar time series characteristics during the monitoring interval. The time-series software telemetry counters of the modified software are used to train a second ML self-organizing map which clusters the software telemetry counters into a second set of clusters, in which each cluster contains software telemetry counters that exhibited similar time series characteristics during the monitoring interval.

For example, in the hypothetical shown in FIG. 9, training a ML self-organizing map using the time-series software telemetry counters obtained from execution of the original software resulted in four clusters—a first cluster that included software telemetry counters EM-8-13 and OR-10-

45; a second cluster that included S software telemetry counters EM-62-12 and EM-15-9; a third cluster that included software telemetry counters OR-6-0 and EM-15-1; and a fourth cluster that included software telemetry counter DA-1-3. By contrast, training a second ML self-organizing map using the time-series software telemetry counters obtained from execution of the modified software resulted in four clusters, but with different cluster membership. Specifically, as shown in FIG. 9, the first cluster created for the modified software only includes software telemetry counters EM-8-13, and the second cluster for the modified cluster includes software telemetry counters OR-10-45, EM-62-12, and EM-15-9. The third and fourth clusters created to describe execution of the modified software are unchanged.

The deviation analysis identifies software telemetry counter OR-10-45 as exhibiting different time-series characteristics when the modified software as compared to the time-series characteristics of the original software, because the cluster membership for software telemetry counter OR-10-45 has changed. Since the time-series characteristics of the software telemetry counters of particular clusters are assumed to be similar, since training the ML self-organizing maps is intended to cluster dimensions according to their similarities, determining that one of the software telemetry counters has been moved from a first cluster to a second cluster is indicative of a possible change in software telemetry counter behavior, which can indicate that the aspect of the modified software where the identified software telemetry counter is located is executing differently than it was in the original version of the software. By clustering time series software telemetry counter values according to their behavioral characteristics, and looking for differences in cluster membership before and after a software modification is implemented, it is possible to identify aspects of the software that are executing differently in the modified software, as compared to an earlier version of the software.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of using a set of self-organizing maps to identify software modifications associated with software performance degradation, comprising:

executing a first version of software, the first version of the software having first software branches that are instrumented with thousands of first software telemetry counters, each respective software telemetry counter of the first software telemetry counters being configured to increment when execution of a respective branch of the first software branches containing the respective software telemetry counter is executed;

periodically collecting values of each of the first software telemetry counters over a first monitoring interval to create a plurality of first time series, one respective first time series for each respective first software telemetry counter;

using each of the first time series as first dimensions of a first input vector to train a first machine learning self-organizing map, by first specifying a first number of a first set of neurons for the first machine learning self-organizing map, randomly initializing a weight vector for each of the neurons of the first machine learning self-organizing map and for each of the first time series determining an Euclidian distance between the first time series and each of the neurons, determining a neuron closest to the first time series and adjusting the weight vector of the closest neuron by a learning parameter and adjusting the weight vectors of the remaining neurons by a smaller learning parameter than the learning parameter, to cause the first machine learning self-organizing map to create a first plurality of clusters, each of the first plurality of clusters containing a respective subset of the first time series with similar time series characteristics, each of the first plurality of clusters further including a respective first membership list identifying which first software telemetry counters were clustered into the respective cluster of the first plurality of clusters;

executing a second version of the software, the second version of the software having second software branches that are instrumented with thousands of second software telemetry counters, each respective software telemetry counter of the second software telemetry counters being configured to increment when execution of the respective branch of the second software branches containing the respective software telemetry counter is executed;

periodically collecting values of each of the second software telemetry counters over a second monitoring interval to create a second plurality of time series, one respective second time series for each respective software telemetry counter, the second monitoring interval having a same amount of time as the first monitoring interval;

using each of the second time series as second dimensions of a second input vector to train a second machine learning self-organizing map, by first specifying a second number of a second set of neurons for the second machine learning self-organizing map, randomly initializing a weight vector for each of the neurons of the second machine learning self-organizing map, and for each of the second time series determining an Euclidian distance between the second time series and each of the neurons, determining a neuron closest to the second time series and adjusting the weight vector of the closest neuron by the learning parameter, and adjusting the weight vectors of the remaining neurons by a second smaller learning parameter than the learning parameter, to cause the second machine learning self-organizing map to create a second plurality of clusters, each of the second plurality of clusters containing a respective subset of the second time series with similar time series characteristics, each of the second plurality of clusters further including a respective second membership list identifying which second software telemetry counters were clustered into the respective cluster of the second plurality of clusters; and implementing a deviation analysis between the first ML self-organized map and the second ML self-organized map by determining a cosine similarity between each cluster of the first plurality of clusters and the respective first membership list for the respective cluster of the first plurality of clusters expressed as a first vector, and each cluster of the second plurality of clusters and the respective second membership list for the respective cluster of the second plurality of clusters expressed as a second vector, to identify a set of one or more of the second software telemetry counters that are most discriminated in the second plurality of clusters relative to the first plurality of clusters; and based on the deviation analysis, determining that the identified set of one or more of the second software telemetry counters that are most discriminated in the second plurality of clusters relative to the first plurality of clusters are on one or more software branches that are associated with a software modification that is causing the software performance degradation; and outputting the set of most discriminated telemetry counters identifying software branches of the executing first version of the software that have different execution characteristics in the executing second version of the software.

2. The method of claim 1, wherein the second version of the software is a modified version of the first version of the software.

3. The method of claim 2, wherein a subset of the second software branches are the same as a subset of the first software branches; and wherein a subset of the second software telemetry counters are the same as a subset of the first software telemetry counters.

4. The method of claim 1, wherein the first and second software telemetry counters are implemented as instructions embedded within sequences of operational instructions forming the software branches within the respective first and second versions of the software.

5. The method of claim 1, wherein each time series is a dataset containing a sequence of data points representing a particular software telemetry counter value that is indexed in time order.

6. The method of claim 1, wherein using each of the first time series as first dimensions of the first input vector causes the first machine learning self-organizing map to create a first weight matrix mapping the first dimensions of the first input vector to the first set of neurons, each neuron of the first set of neurons being associated with a respective cluster of the first plurality of clusters; and wherein using each of the second time series as second dimensions of the second input vector causes the second machine learning self-organizing map to create a second weight matrix mapping the second dimensions of the second input vector to the second set of neurons, each neuron of the second set of neurons being associated with a respective cluster of the second plurality of clusters.

7. The method of claim 6, wherein the second number of neurons in the second set of neurons is the same as the first number of neurons in the first set of neurons.

8. The method of claim 7, wherein the number of first neurons is approximately equal to a square root of a number of the first dimensions.

9. The method of claim 1, wherein periodically collecting the values of each of the first software telemetry counters over the first monitoring interval is implemented at a fixed periodicity; and wherein periodically collecting the values of each of the second software telemetry counters over the second monitoring interval is implemented at the same fixed periodicity.

10. The method of claim 1, wherein the first machine learning self-organizing map is a first trained neural network, and wherein the second machine learning self-organizing map is a second trained neural network.

11. The method of claim 1, wherein each respective first cluster further includes location coordinates within the self-organizing map of a respective neuron associated with the respective first cluster.

12. The method of claim 1, wherein the time series characteristics include a movement of the counter values over time and a shape of a graph of the time series.

13. The method of claim 1, wherein implementing a deviation analysis comparing the first plurality of clusters with the second plurality of clusters provides, as an output, a set of software telemetry counters that are clustered differently in the second machine learning self-organizing map than in the first machine learning self-organizing map.

14. A system for identifying software modifications associated with software performance degradation, comprising:

one or more processors and one or more storage devices storing instructions that are configured, when executed by the one or more processors, to cause the one or more processors to perform operations comprising:

executing a first version of software, the first version of the software having first software branches that are instrumented with thousands of first software telemetry counters, each respective software telemetry counter of the first software telemetry counters being configured to increment when execution of a respective branch of the first software branches containing the respective software telemetry counter is executed;

periodically collecting values of each of the first software telemetry counters over a first monitoring interval to create a plurality of first time series, one respective first time series for each respective first software telemetry counter;

using each of the first time series as first dimensions of a first input vector to train a first machine learning self-organizing map, by first specifying a first number of a first set of neurons for the first machine learning self-organizing map, randomly initializing a weight vector for each of the neurons of the first machine learning self-organizing map and for each of the first time series determining an Euclidian distance between the first time series and each of the neurons, determining a neuron closest to the first time series and adjusting the weight vector of the closest neuron by a learning parameter and adjusting the weight vectors of the remaining neurons by a smaller learning parameter than the learning parameter, to cause the first machine learning self-organizing map to create a first plurality of clusters, each of the first plurality of clusters containing a respective subset of the first time series with similar time series characteristics, each of the first plurality of clusters further including a respective first membership list identifying which first software telemetry counters were clustered into the respective cluster of the first plurality of clusters;

executing a second version of the software, the second version of the software being a modified version of the first version of the software and having second software branches that are instrumented with thousands of second software telemetry counters, each respective software telemetry counter of the second software telemetry counters being configured to increment when execution of the respective branch of the second software branches containing the respective software telemetry counter is executed;

periodically collecting values of each of the second software telemetry counters over a second monitoring interval to create a second plurality of time series, one respective second time series for each respective software telemetry counter, the second monitoring interval having a same amount of time as the first monitoring interval;

using each of the second time series as second dimensions of a second input vector to train a second machine learning self-organizing map, by first specifying a second number of a second set of neurons for the second machine learning self-organizing map, randomly initializing a weight vector for each of the neurons of the second machine learning self-organizing map, and for each of the second time series determining an Euclidian distance between the second time series and each of the neurons, determining a neuron closest to the second time series and adjusting the weight vector of the closest neuron by the learning parameter, and adjusting the weight vectors of the remaining neurons by a second smaller learning parameter than the learning parameter, to cause the second machine learning self-organizing map to create a second plurality of clusters, each of the second plurality of clusters containing a respective subset of the second time series with similar time series characteristics, each of the second plurality of clusters further including a respective second membership list identifying which second software telemetry counters were clustered into the respective cluster of the second plurality of clusters; and implementing a deviation analysis between the first ML self-organized map and the second ML self-organized map by determining a cosine similarity between each cluster of the first plurality of clusters and the respective first membership list for the respective cluster of the first plurality of clusters expressed as a first vector, and each cluster of the second plurality of clusters and the respective second membership list for the respective cluster of the second plurality of clusters expressed as a second vector, to identify a set of one or more of the second software telemetry counters that are most discriminated in the second plurality of clusters relative to the first plurality of clusters; and based on the deviation analysis, determining that the identified set of one or more of the second software telemetry counters that are most discriminated in the second plurality of clusters relative to the first plurality of clusters are on one or more software branches that are associated with a software modification that is causing the software performance degradation; and outputting the set of most discriminated telemetry counters identifying software branches of the executing first version of the software that have different execution characteristics in the executing second version of the software.

15. The system of claim 14, wherein the first and second software telemetry counters are implemented as instructions embedded within sequences of operational instructions forming the software branches within the respective first and second versions of the software.

16. The system of claim 14, wherein each time series is a dataset containing a sequence of data points representing a particular software telemetry counter value that is indexed in time order.

17. The system of claim 14, wherein using each of the first time series as first dimensions of the first input vector causes the first machine learning self-organizing map to create a first weight matrix mapping the first dimensions of the first input vector to the first set of neurons, each neuron of the first set of neurons being associated with a respective cluster of the first plurality of clusters; and wherein using each of the second time series as second dimensions of the second input vector causes the second machine learning self-organizing map to create a second weight matrix mapping the second dimensions of the second input vector to the second set of neurons, each neuron of the second set of neurons being associated with a respective cluster of the second plurality of clusters; and wherein the second number of neurons in the second set of neurons is the same as the first number of neurons in the first set of neurons.

18. The system of claim 14, wherein periodically collecting the values of each of the first software telemetry counters over the first monitoring interval is implemented at a fixed periodicity; and wherein periodically collecting the values of each of the second software telemetry counters over the second monitoring interval is implemented at the same fixed periodicity.

19. The system of claim 14, wherein the first machine learning self-organizing map is a first trained neural network, and wherein the second machine learning self-organizing map is a second trained neural network.

20. The system of claim 14, wherein the time series characteristics include a movement of the counter values over time and a shape of a graph of the time series.

\* \* \* \* \*